C. E. CURTISS.
FRICTION DRIVEN AUTOMOBILE POWER JACK.
APPLICATION FILED MAR. 8, 1919.
1,383,450.
Patented July 5, 1921.
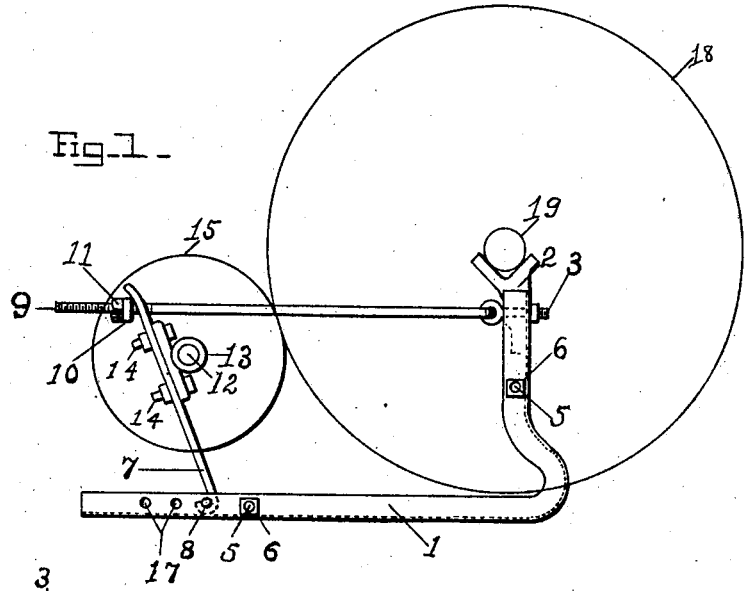
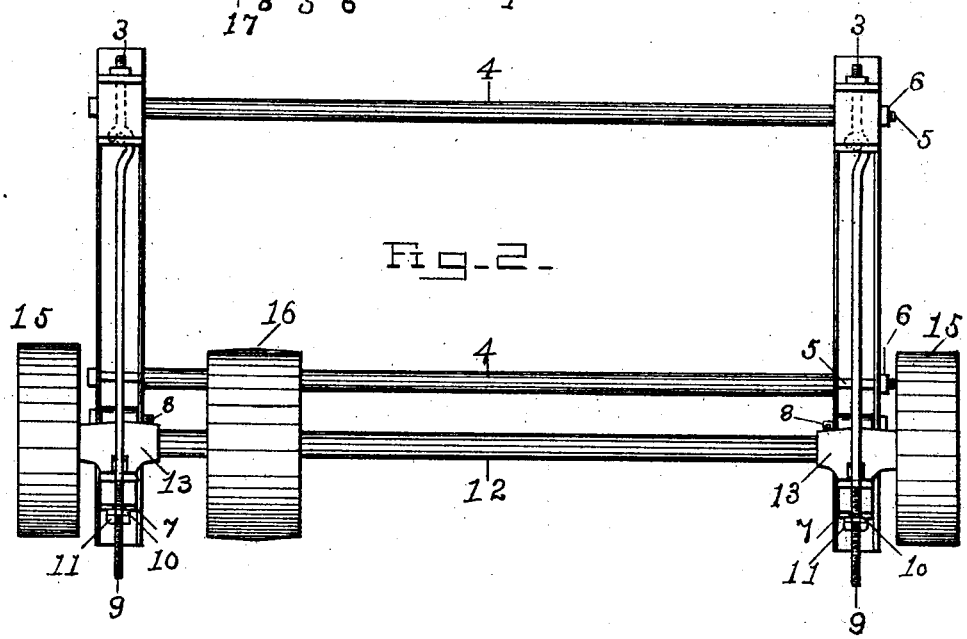
INVENTOR
Charles E. Curtiss

UNITED STATES PATENT OFFICE.

CHARLES E. CURTISS, OF CLINTON, WISCONSIN.

FRICTION-DRIVEN AUTOMOBILE POWER-JACK.

1,383,450.  Specification of Letters Patent.  Patented July 5, 1921.

Application filed March 8, 1919. Serial No. 281,533.

*To all whom it may concern:*

Be it known that I, CHARLES E. CURTISS, a citizen of the United States, residing at Clinton, in the county of Rock and State of Wisconsin, have invented new and useful Improvements in Friction-Driven Automobile Power-Jacks, of which the following is a specification.

My invention relates to automobile power transmission and by its use various belt driven machines may be operated.

The object of this invention is to secure, not only a device that will do the work for which it is designed, but also to secure a device composed of few and simple parts easily manufactured, convenient to operate and quickly disassembled for storage or shipment.

These objects are attained by the mechanism illustrated in the accompanying drawing in which—

Figure 1 is a side elevation, also showing the outline of an automobile wheel and a rear axle housing.

Fig. 2 is a plan view of the power jack.

Similar numerals refer to similar parts in both Fig. 1 and Fig. 2.

The side pieces of the frame, 1, are channels, two in number, and are alike in form, clearly shown in Fig. 1. Each side piece carries a concave seat, 2—2, at its upper terminal for the purpose of receiving the housing of the rear axle of an automobile. The side pieces are held together by means of long bolts, 5—5, and nuts, 6—6, each bolt passing through a pipe, 4—4, which bears against the inside of the side pieces and keeps them properly spaced. There are two pipes, one between the horizontal portions and one between the vertical portions of the side pieces, shown at 4—4, Fig. 2.

The arms, 7—7, are hinged at their lower ends to the frame side pieces, as shown at 8, Fig. 1, by means of a pin, 8, passing through the flanges of the channels, 1—1, the curved end of the arms partially encircling the pins 8. Other well known means of hinging the arms to the frame may be employed but the method shown has the advantage of easily detaching the arms from the frame and is to be preferred.

The arms, 7—7, have a slot at their upper ends to receive the tension rods, 9—9, and each tension rod is provided with a thread, nut and washer at one end and a hook at the opposite end; the threaded end is received in the slot in arms, 7—7, as before mentioned, and the hook takes eye bolt, 3—3, which passes through seat 2, and also through the upper terminal of the side piece, 1—1, and has a nut to secure these parts together.

The hinged arms, 7—7, each carry a shaft bearing, 13—13; these bearings support a shaft, 12, which carries a friction pulley at either end, 15—15, and a belt pulley, 16, between the bearings.

The holes shown at 17, Fig. 1, are used for adjustment of the foot of the arms, 7—7, adapting the device to use with automobile wheels of larger diameter than that shown at 18, Fig. 1.

To place the power jack in operative position it is only necessary to place the frame seats, 2—2, against the housing of the rear axle of an automobile, letting the rounded nose of the jack frame strike the ground or floor as near as possible beneath the rear axle of the automobile, then press down on the outer part of the jack frame and the automobile will rise and come to the center of support which is well within the base of the power jack, as shown in Fig. 1.

In this position the automobile wheels are raised from the ground and the jack frame is held in operative position by the weight of the automobile.

The arms, 7—7, carrying the shaft, 12, may now be hooked on to the hinge pins, 8—8, the shaft, 12, may then be raised about the hinge centers until the friction pulleys strike the tires of the automobile; in this position of the shaft, 12, the tension rods, 9—9, will drop into the slots in the upper end of the arms, 7—7.

Any desired pressure between automobile wheels, 18, and friction pulleys, 15—15, may be produced by adjusting the tension rod nuts, 11—11.

The ease with which the arms, 7—7, may be detached from the frame is an advantage as the device then separates into two parts of about equal weight, without the removal of even a nut or cotter, either part can then be handled readily by one person.

A further object of the construction is, an endless belt may be put on or taken off without tearing the jack to pieces.

The jack frame is taken down by the removal of two nuts, 6—6, it then may be stored in small space or bundled for shipment, as before mentioned.

From the foregoing it should not be understood that I confine myself to the forms and material shown and described, as other forms and materials may be used with success without departing from the spirit of the invention nor as to what is claimed.

What is claimed is:—

1. A friction drive automobile power jack, comprising a supporting frame, arms having open hooks at their lower terminals embracing hinge pins within the frame and slots in their upper terminals for the reception of tension means; a shaft, carrying two friction pulleys and a drive pulley rotatably mounted on said arms and means for forcing said arms into, and holding them in any desired position about their hinges.

2. A friction drive automobile power jack, comprising a supporting frame, having a rounded nose at its supporting end, arms hinged within the bed of said frame, a shaft, carrying two friction pulleys and a power pulley, rotatably mounted upon said arms and means for forcing, and holding, said friction pulleys into operative frictional contact with the rear wheels of an automobile.

3. In a friction driven automobile power jack, a knockdown frame comprising two side pieces of similar form and dimensions, each made from a single piece of structural steel separated by two pipes and secured together by two nuts and bolts, the latter passing through the pipes and side pieces, said side pieces each having a bearing portion and a supporting portion substantially at right angles to each other, said portions being connected by a reverse curve and the supporting portion terminating in a seat well within the base of support.

CHARLES E. CURTISS.

Witnesses:
F. W. HERRON,
MARY C. JENSEN.